United States Patent
Noli

(10) Patent No.: US 10,139,286 B2
(45) Date of Patent: Nov. 27, 2018

(54) JUNCTION ASSEMBLY OF ELECTRICAL CABLES, AND THERMOCOUPLE SENSOR COMPRISING SUCH JUNCTION

(71) Applicant: ITALCOPPIE SENSORI S.R.L., Malagnino (IT)

(72) Inventor: Mario Noli, Parma (IT)

(73) Assignee: ITALCOPPIE SENSORI S.R.L., Malagnino (CR) (IT)

( * ) Notice: Subject to any disclaimer, the term of this patent is extended or adjusted under 35 U.S.C. 154(b) by 242 days.

(21) Appl. No.: 15/024,270

(22) PCT Filed: Oct. 15, 2014

(86) PCT No.: PCT/IB2014/065335
§ 371 (c)(1),
(2) Date: Mar. 24, 2016

(87) PCT Pub. No.: WO2015/056189
PCT Pub. Date: Apr. 23, 2015

(65) Prior Publication Data
US 2016/0209276 A1    Jul. 21, 2016

(30) Foreign Application Priority Data

Oct. 16, 2013   (IT) .............................. MI2013A1718

(51) Int. Cl.
*G01K 1/08*     (2006.01)
*G01K 7/02*     (2006.01)
(Continued)

(52) U.S. Cl.
CPC ................. *G01K 1/08* (2013.01); *G01K 7/02* (2013.01); *G01K 7/023* (2013.01); *G01K 7/04* (2013.01); *H02G 15/10* (2013.01); *H02G 15/18* (2013.01)

(58) Field of Classification Search
CPC ............ G01K 1/08; G01K 7/02; G01K 7/023; G01K 7/04; H02G 15/10; H02G 15/18
See application file for complete search history.

(56) References Cited

U.S. PATENT DOCUMENTS 3,144,507 A * 8/1964 Scadron ................... H01R 4/00
174/76
3,811,958 A   5/1974 Maurer
(Continued)

FOREIGN PATENT DOCUMENTS

EP       370411 A2    5/1990
EP      1990619 A2   11/2008
(Continued)

OTHER PUBLICATIONS

International Search Report for International Application No. PCT/IB2014/065335 (dated Feb. 9, 2015) (10 Pages).

*Primary Examiner* — Lisa Caputo
*Assistant Examiner* — Philip Cotey
(74) *Attorney, Agent, or Firm* — Lucas & Mercanti, LLP

(57) ABSTRACT

A junction assembly having A) a first electrical cable in turn comprising a first and a second electrical conductor and an insulating coating made of insulating inorganic material, B) a second electrical cable having a third and a fourth electrical conductor and an insulating coating made of insulating organic material that coats and electrically insulates the third and fourth electrical conductor; C) a junction having a sleeve that forms two ends one of which is arranged to receive the first electrical cable and the other is arranged to receive the second electrical cable. The first and the third electrical conductor are mechanically and electrically connected together to form a first composite conductor. The second and the fourth electrical conductor are connected (Continued)

together to form a second composite conductor. An intermediate wall is arranged between the two.

15 Claims, 4 Drawing Sheets

(51) Int. Cl.
    *G01K 7/04*     (2006.01)
    *H02G 15/10*     (2006.01)
    *H02G 15/18*     (2006.01)

(56) References Cited

U.S. PATENT DOCUMENTS

| | | | | |
|---|---|---|---|---|
| 3,867,205 A | * | 2/1975 | Schley | G01K 7/04 |
| | | | | 136/202 |
| 4,454,370 A | * | 6/1984 | Voznick | G01K 7/04 |
| | | | | 136/221 |
| 4,934,831 A | * | 6/1990 | Volbrecht | G01K 1/08 |
| | | | | 29/612 |
| 5,088,835 A | * | 2/1992 | Shigezawa | G01K 7/023 |
| | | | | 136/230 |
| 5,999,081 A | * | 12/1999 | Hannigan | G01K 1/10 |
| | | | | 338/229 |
| 2008/0025372 A1 | * | 1/2008 | Culbertson | G01K 1/08 |
| | | | | 374/185 |
| 2011/0222583 A1 | | 9/2011 | Boghun et al. | |
| 2012/0199392 A1 | * | 8/2012 | Samuelson | H02G 15/08 |
| | | | | 174/88 R |

FOREIGN PATENT DOCUMENTS

EP            2157416 A2     2/2010
WO     2009002682 A1    12/2008

* cited by examiner

JUNCTION ASSEMBLY OF ELECTRICAL CABLES, AND THERMOCOUPLE SENSOR COMPRISING SUCH JUNCTION

CROSS-REFERENCE TO RELATED APPLICATIONS

This application is a 371 of PCT/IB2014/065335, filed Oct. 15, 2014, which claims the benefit of Italian Patent Application No. MI2013A001718, filed Oct. 16, 2013.

FIELD OF THE INVENTION

The present invention concerns a junction assembly able to be used to mechanically and electrically connect two electrical cables, one coated with a substantially inorganic insulating material, and another electrical cable coated with a substantially organic insulating material. Such a junction can be applied for example in the production of thermocouple sensors and, more specifically, for making so-called "transitions" that electrically and mechanically connected the detecting (or "sensitive") portions of the thermocouples and their extension cables.

STATE OF THE ART

Current thermocouples 1 comprise a detecting portion 3 formed from a first pair of wires 5, 7 that are electrically conductive and coated by a first protective sheath 9, made as a "mineral" coating, i.e. typically made of magnesium oxide, capable of withstanding the high operating temperatures required (FIG. 1). In order to be able to install it more easily, the detecting portion 3 is generally connected to an extension cable 11, which in turn comprises a second pair of electrically conductive wires 13, 15 and a flexible sheath 17 that coats them; the flexible sheath 17 is often made of Kapton, Teflon or another polymeric material. The extension cable conducts the signal emitted by the detecting rod 3 far from the acquisition point up to a suitable acquisition and measuring instrument, located in an area at a less hostile temperature. The detecting portion 3 and the extension cable are connected by a junction usually called "transition". Examples of known thermocouples and transitions are described, for example, in publications EP 370 411 A1 and U.S. Pat. No. 3,811,958.

In order to increase tensile strength at high temperatures and in general resistance to thermomechanical stresses of known transitions the author of the present invention has devised the transition 19 shown in FIG. 1, which comprises a metallic tubular sleeve 21 in the ends of which an end of the detecting rod 3 and of the extension cable 11 are inserted and subsequently crimped; on one side of an intermediate section of the sleeve 21 a recess 23 is arranged allowing the wire 5, for example made of iron, to be welded together with the wire 13, and the wire 7, for example made of constantan, to be welded together with the wire 15.

A protective casing 19 of a suitable insulating plastic material is then co-moulded on the assembly formed from the sleeve 21 and from the wires 5, 7, 13, 15 that have been welded. The metallic sleeve 21 manages to ensure a high tensile strength of the junction even at high operating temperatures, for example even at 300-400° C.

However, the author of the present invention has observed that the process for producing a thermocouple with the known sleeve 21 has some limitations: for example, special provisions and precautions are necessary to hold in position the two welded ends of the wires, 7+15 and 5+13, respectively, during co-moulding, in order to prevent the flow of plastic material injected from unwelding the ends, or bringing all four wires 5, 7, 13, 15 into contact, in both cases making the thermocouple irredeemably unusable.

A purpose of the present invention is to avoid the aforementioned drawbacks of the state of the art and, in particular, to provide a junction assembly, able to be used to electrically and mechanically connect a first cable capable of withstanding relatively high temperatures, over 200-400° C., to a second cable that must normally act at lower temperatures, which makes it possible to more easily make welds, or in any case electrical connections, inside the junction assembly itself more reliable.

SUMMARY OF THE INVENTION

In a first aspect of the present invention such a purpose is achieved with a junction assembly having the features according to claim 1.

In a second aspect of the present invention such a purpose is achieved with a thermocouple sensor having the features according to claim 14.

Further features of the device are the object of the dependent claims.

The advantages that can be obtained with the present invention will become clearer to the person skilled in the art from the following detailed description of a particular example embodiment not for limiting purposes, illustrated with reference to the following schematic figures.

LIST OF FIGURES

DETAILED DESCRIPTION

Figure 2:
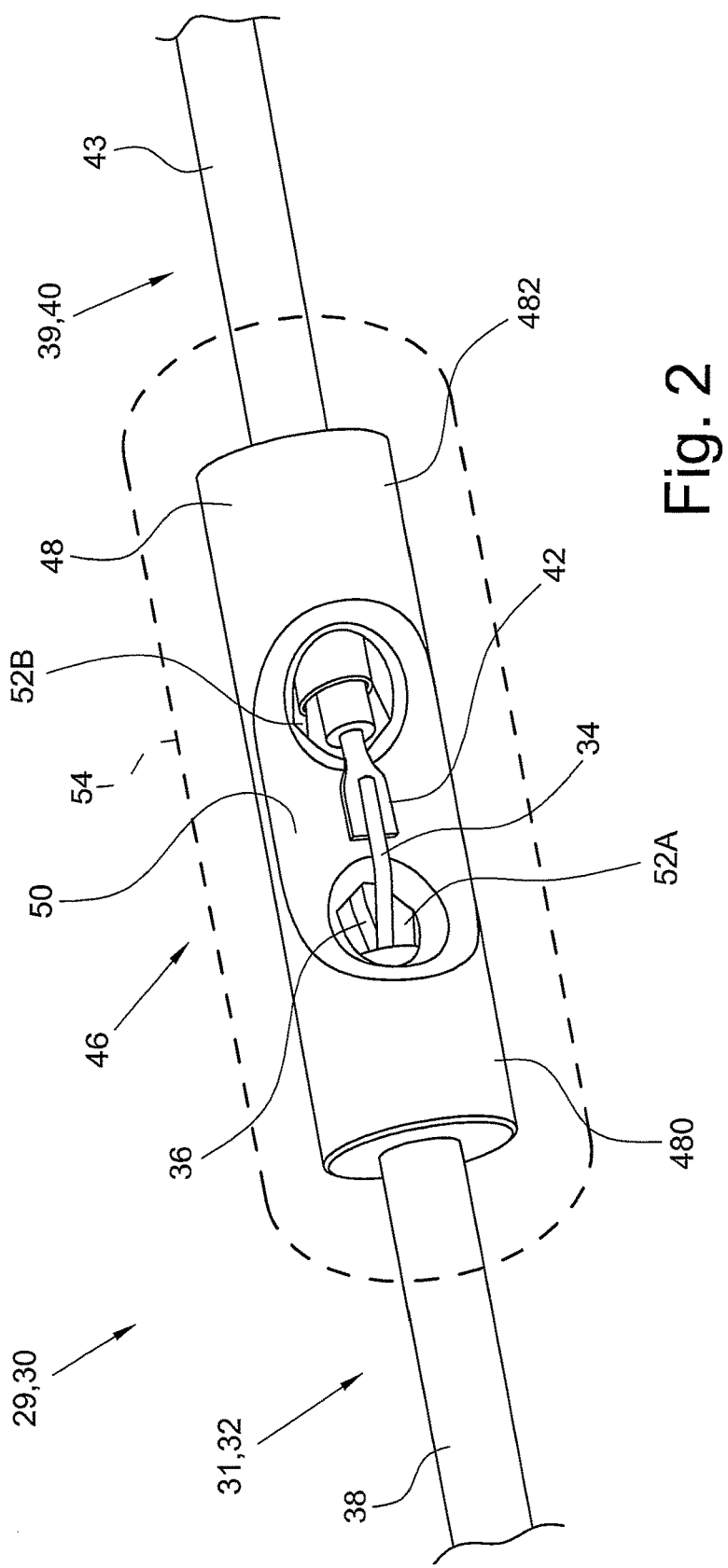
FIG. 2 shows a perspective view of a transition of a junction assembly according to a particular embodiment of the invention.
Figure 3:
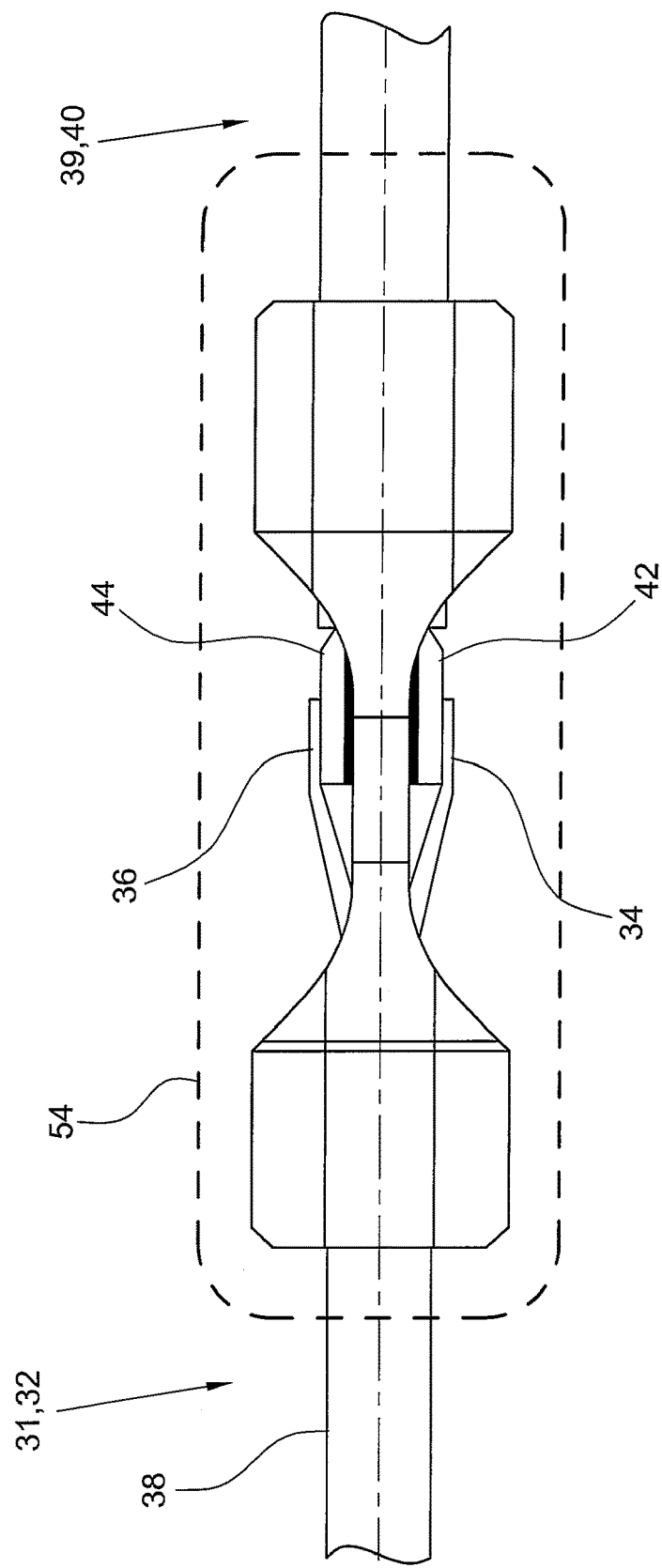
FIG. 3 shows a view from above of the transition of FIG. 2.
Figure 4:
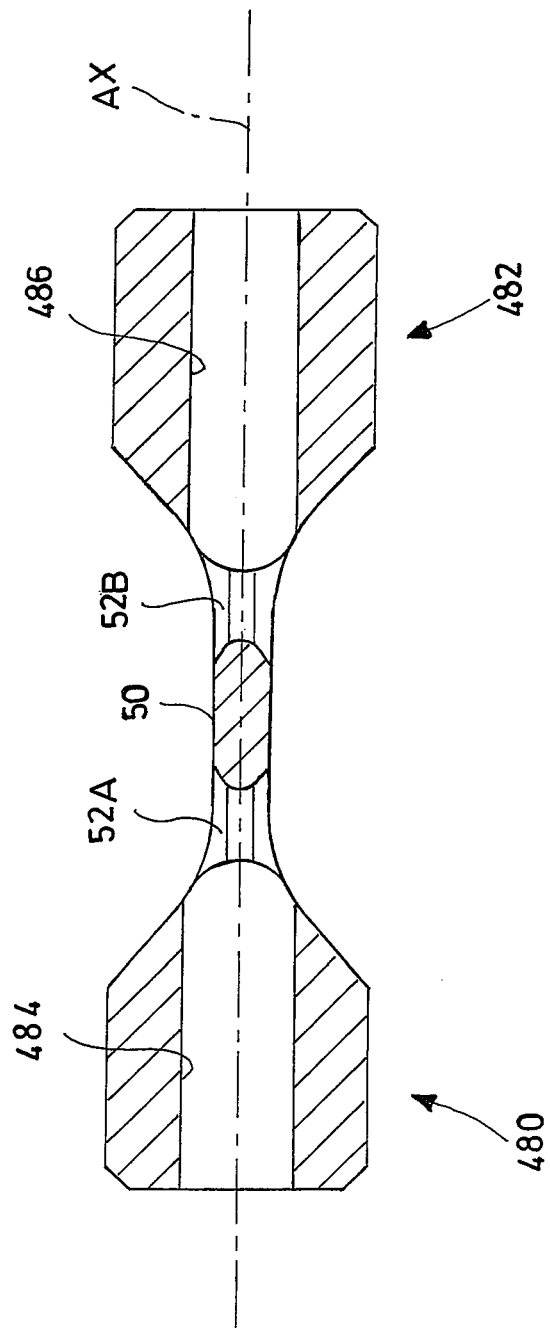
FIG. 4 shows a section view, according to the plane IV-IV, of the sleeve of the transition of FIG. 2.

FIGS. 2-4 relate to a junction assembly according to a particular embodiment of the invention, indicated with the overall reference numeral 29.

The junction assembly 29 comprises:

a first electrical cable 31 in turn comprising a first 34 and a second electrical conductor 36 arranged side by side to one another, and an insulating coating made of substantially inorganic insulating material 38 that coats and electrically insulates the first 34 and the second electrical conductor 36 from the outside and from each other;

a second electrical cable 39 comprising a third 42 and a fourth electrical conductor 44 arranged side by side to one another, and an insulating coating made of substantially organic insulating material 43 that coats and electrically insulates the third 42 and the fourth electrical conductor 44 from the outside and from each other.

The inorganic insulating coating 38 is made of a material capable of withstanding higher operating temperatures than those that can be withstood by plastic materials, for example withstanding temperatures equal to or greater than 200-400° C. For this purpose, the material that forms the covering 38 is different from a synthetic resin, it can be a magnesium oxide (MgO) and it can form, for example, a more or less flexible sheath. The material of the organic insulating coating 43, on the other hand, is a polymeric resin, suitably flexible, so as to facilitate the mounting of the thermocouple 30 or other device that the junction assembly 29 is part of.

The conductors 34, 36, 42, 44 are preferably made of metallic materials.

According to an aspect of the invention, the junction assembly 29 also comprises a junction 46, also called "transition 46", in turn comprising:

a sleeve 48 that forms two ends 480, 482 one of which receives and is fastened to the first electrical cable 31 and the other receives and is fastened to the second electrical cable 39; and a protective casing 54 that coats the assembly formed from the sleeve 48 and the joined ends of the conductors.

In the junction 46 the first 34 and the third electrical conductor 42 are mechanically and electrically connected together to form a first composite conductor.

The second 36 and the fourth electrical conductor 44 are mechanically and electrically connected together to form a second composite conductor.

The junction 46 has an intermediate portion that forms an intermediate wall 50 arranged longitudinally with respect to the sleeve 48 itself and arranged between the first and the second composite conductor (FIGS. 2, 3).

The aforementioned composite conductors thus ensure the electrical continuity of the two ends of the junction assembly 29, allowing electrical signals or electrical power to be transmitted.

The ends 480, 482 of the sleeve 48 are preferably but not necessarily tubular, forming two inner cavities that are coaxial to one another arranged longitudinally to the sleeve 48. The conductors 34, 36, 42, 44 are preferably in the form of wires. The two composite conductors can be obtained by welding, for example by laser, brazing or gluing together the conductors 34 and 36 and the conductors 42 and 44, respectively, possibly flattening the ends of some of such conductors.

The connection areas between the first 34 and the third conductor 36, and between the second 42 and the fourth conductor 44, are advantageously at the intermediate wall 50.

The intermediate wall 50 can be bounded, at two opposite ends thereof, by two holes or other through openings 52A, 52B that extend transversally to the sleeve; advantageously, each one of the two ends of the sleeve 480, 482 forms a longitudinal cavity 484 and 486, respectively, that opens out into one of the holes or other transversal through openings 52A, 52B.

Advantageously, the edges of the holes or other transversal through openings 52A, 52B, or in general of the two ends of the intermediate wall 50, have substantially tapered cross sections, for example V or cusp shaped.

Advantageously, each longitudinal cavity 484, 486 extends along an axis AX substantially coplanar to the intermediate wall 50. In this way, by inserting the first electrical cable 31 into a longitudinal cavity 484, and the other electrical cable 39 into the other longitudinal cavity 486, such longitudinal cavities and the tapered edges of the holes or other transversal through openings 52A, 52B naturally guide the conductors 36 and 44 on one side of the intermediate wall 50, and the conductors 34, 42 on the other side of the wall 50, speeding up and substantially facilitating the assembly of the junction 46.

Advantageously, the transversal through openings 52A, 52B are arranged in a position substantially symmetrical at least with respect to an imaginary plane IV-IV passing through the common axis AX of the longitudinal cavities 484, 486 and perpendicular to the plane in which the intermediate wall 50 lies (FIG. 2): in this way the tensile and flexural strength of the sleeve 48 are at their maximum with respect to same resistant sections.

Advantageously, the sleeve 48 is made of metallic material, so as to be able to fix it firmly to the cables 31 and 39 through crimping or other types of plastic deformation. Advantageously, the sleeve 48 is made of an electrically insulating material, for example anodized aluminium.

The junction 46 preferably also comprises a protective casing 54 made of a suitable insulating plastic material or other electrically insulating material, which coats the assembly formed from the sleeve 48 and from the joined ends of the conductors 34, 36, 42, 44. Preferably the protective casing 54 is made of a suitable refractory polymer. The protective casing 54 can advantageously be co-moulded on the assembly formed from the sleeve 48 and the joined ends of the conductors 34, 36, 42, 44; this technique makes it possible to incorporate the conductors 34, 36, 42, 44 into the co-moulded insulating mass.

The junction assembly 29 can, for example, be part of a thermocouple 30: in this case the first electrical cable 31 forms the detecting portion 32, commonly also called "sensitive portion", of the thermocouple itself, whereas the second electrical cable 39 forms the extension portion of the thermocouple and is used for taking the electrical signals of the detecting portion 32 to a suitable acquisition or transduction apparatus, facilitating the mounting of the thermocouple itself.

The conductors 34 and 42 are made of a different metal from that of the conductors 36 and 44, so as to produce a substantial thermoelectric effect, such as the Seebeck, Peltier or Thomson effect. The combinations of metals to cause such thermoelectric effects can be, for example, Chromel and Alumel, iron and constantan, copper and constantan, Chromel and constantan, Nicrosil and Nisil.

Figure 1:
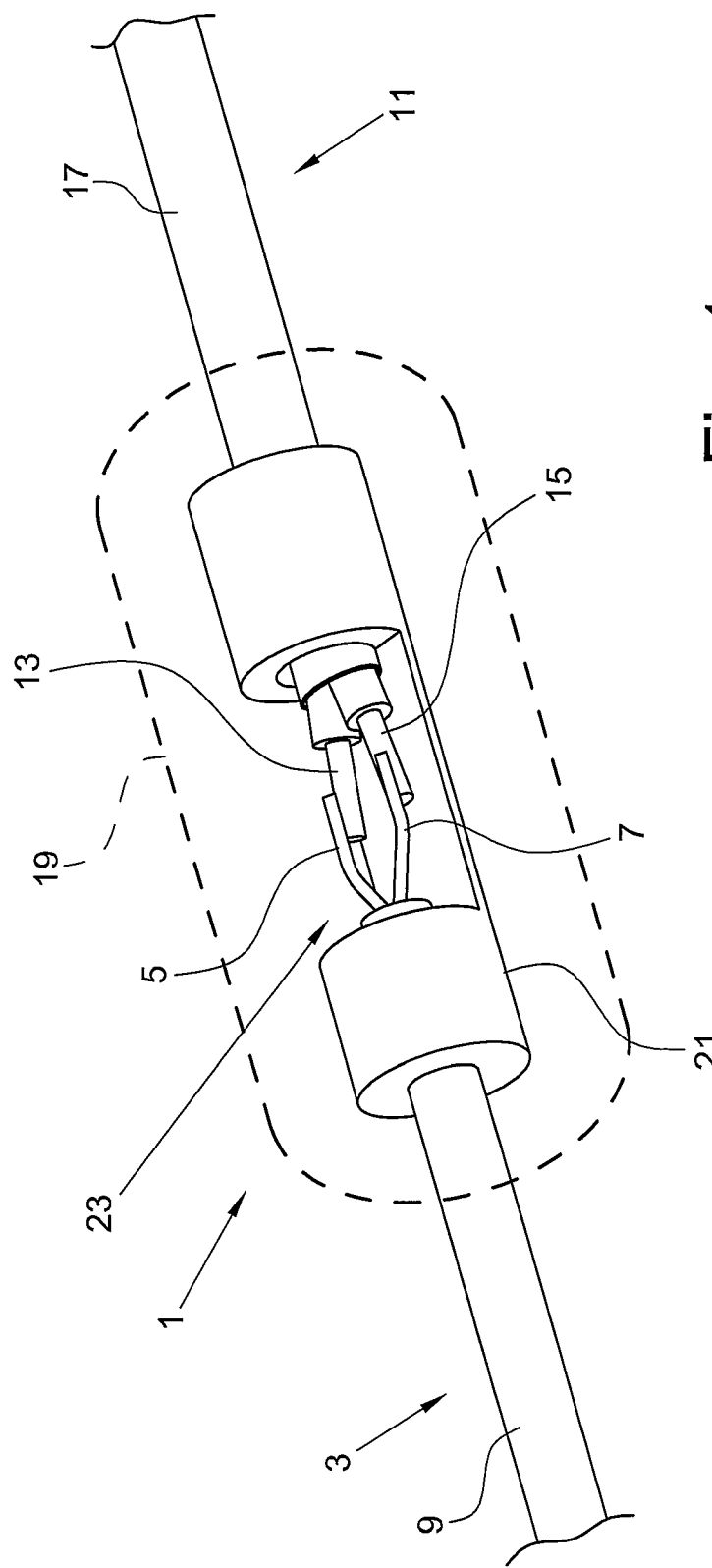
FIG. 1 shows a perspective view of a known transition of a thermocouple.

The thermocouple 30 can be mounted, for example, on injection moulds or on machine tools; an inorganic insulating coating 38 based on magnesium oxide is particularly suitable for such applications. In order to assembly the junction assembly 29 or the thermocouple 30, the ends of the two pairs of conductors 34+36, and 42+44 are introduced, the first into the end 480, the second into the other end 482 of the sleeve 48, overlapping the ends of the conductors 34 and 42 in front of a face of the intermediate wall 50, and the ends of the conductors 36 and 44 in front of the other face of the wall 50; the edges with tapered cross sections of the edges of the wall 50 facilitate and speed up the positioning of the ends of the conductors 34, 36, 42, 44 around the wall 50. After this, the ends 480, 482 of the sleeve 48 are crimped, or in any case permanently deformed, on the first 38 and on the second insulating sheath 43, or in any case on the conductors 34, 36, 42, 44, and the end that are overlapping, or in any case in contact, of the conductors 34, 36, 42, 44 are welded. Since the two welds of the wires 34, 36, 42, 44 are separated by the intermediate wall 50, they require less provisions and precautions with respect to the transition of FIG. 1 to keep the wires to be welded in position, and precautions are not necessary to keep the two pairs of wire to be joined separate from one another, either during welding or during the co-moulding or more generally during the formation of the casing 54. Since the sleeve 48 is made of anodized aluminium, it is possible to rest the welded wires 34, 36, 42, 44 freely and directly against it during the co-moulding of the protective casing 54 or in any case during the operation of the thermocouple, without causing it to short circuit.

The above teachings make it possible to simplify, speed up and consequently make more cost-effective the production cycle of thermocouples, indicatively shortening it by 1-2 minutes for each thermocouple and reducing the percentage of thermocouples that are defective after co-moulding of the casing 54 by 10 times. Since it is metallic, the sleeve 48 ensures a very high tensile strength of the thermocouple, which is advantageous when considering that the cable that forms the extension portion can reach lengths even of over one meter. Moreover, being metallic ensures that the tensile strength of it and of the junction 46 is substantially independent from the usual, even high, operating temperatures of the junction itself, and in particular it does not undergo substantial degradation at temperatures around 300° C. Since it is electrically insulating, the sleeve 48 ensures that the co-moulded casing 54 is not strictly essential and a thermocouple according to the invention could also operate without it; the co-moulded casing has mainly a function of further electrical insulation of the transition and its mechanical function becomes more marginal. However, since the structural strength, in particular tensile strength, of the junction 46 is ensured by the metallic sleeve 48 alone, the protective casing 54 can be made of a plastic material that may be not only thermosetting but also thermoplastic, with the advantage that the latter requires a much shorter moulding time with respect to thermosetting resins.

The example embodiments described above can undergo various modifications and variations without departing from the scope of protection of the present invention. For example, the protective casing 54 that coats the assembly formed from the sleeve 48 and the joined ends of the conductors 34, 36, 42, 44 can be obtained not only by co-moulding, but can for example also be made by casting or embedding the sleeve 48 and the junction area of the conductors 34, 36, 42, 44 in a suitable thermoplastic or thermosetting resin contained in a suitable preformed casing, or furthermore as a sheath that is preformed and fitted onto the sleeve 48; the sheath 54 can possibly be heat-shrinking. A junction assembly according to the invention can be used to produce not only thermocouples, but also other devices, such as heating thermistors.

Moreover, all of the details can be replaced by technically equivalent elements. For example, the materials used, as well as the sizes, can be whatever according to the technical requirements. It should be understood that an expression of the type "A comprises B, C, D" or "A is formed from B, C, D" also comprises and describes the particular case in which "A consists of B, C, D". The examples and lists of possible variants of the present application should be considered to be non-exhaustive lists.

The invention claimed is:

1. Junction assembly comprising:
   a first electrical cable in turn comprising a first and a second electrical conductor and an insulating coating made of insulating inorganic material that coats and electrically insulates the first and the second electrical conductor;
   a second electrical cable comprising a third and a fourth electrical conductor and an insulating coating made of insulating organic material that coats and electrically insulates the third and the fourth electrical conductor;
   a junction comprising a sleeve that forms two ends; and further comprising a protective casing covering the assembly comprising the sleeve and the joined ends of the conductors;
   and wherein:
   the first and the third electrical conductor are mechanically and electrically connected together to form a first composite conductor;
   the second and the fourth electrical conductor are mechanically and electrically connected together to form a second composite conductor;
   one of the two ends of the sleeve receives and is fastened to the first electrical cable and the other of the two ends of the sleeve receives and is fastened to the second electrical cable;
   one of the two ends is fixed through permanent plastic deformation to the insulating coating made of insulating inorganic material of the first electrical cable or to the first and second electrical conductor of the first electrical cable;
   the other of the two ends of the sleeve is fixed through permanent plastic deformation to the insulating coating made of insulating organic material of the second electrical cable or to the third and fourth electrical conductor of the second electrical cable; and
   the sleeve includes an intermediate wall in between the two ends and arranged between the first and the second composite conductor.

2. Junction assembly according to claim 1, wherein the connection area between the first and the third conductor and the connection area between the second and the fourth conductor are located at the intermediate wall.

3. Junction assembly according to claim 1, wherein the sleeve is made of a metallic material.

4. Junction assembly according to claim 1, wherein the sleeve is made of an electrically insulating material.

5. Junction assembly according to claim 4, wherein the sleeve is made of anodized aluminium.

6. Junction assembly according to claim 1, wherein the ends of the sleeve are substantially tubular in shape and form through cavities or holes inside them that extend in a substantially longitudinal direction with respect to the sleeve itself.

7. Junction assembly according to claim 6, wherein the intermediate wall is bounded, at two opposite ends thereof, by two holes or other through openings that extend transversally to the sleeve, and the through cavities or holes formed by the ends of the sleeve each open out into one of the holes or other transversal through openings.

8. Junction assembly according to claim 6, wherein each of the through cavities or holes that extend in a substantially longitudinal direction with respect to the sleeve itself, each inside an end of the sleeve, extends along an axis (AX) substantially coplanar to the intermediate wall.

9. Junction assembly according to claim 1, wherein the ends of the sleeve are fixed to the first, to the second, to the third and to the fourth conductor through crimping or other permanent mechanical deformation.

10. Junction assembly according to claim 1, wherein the first and the second composite conductor are obtained by respectively connecting the first and the third electrical conductor, and the second and the fourth electrical conductor, through one or more of the following processes: welding, brazing, braze welding, gluing and plastic deformation.

11. Junction assembly according to claim 1, wherein the protective casing is made with one of the following techniques:

co-moulded or cast on the assembly formed from the sleeve and from the joined ends of sleeve is fastened to the first or second the conductors;

providing a sheath of heat-shrinking material containing the sleeve and the connection areas of the first with the third electrical conductor, and of the second with the fourth electrical conductor;

embedding and/or incorporating, in an electrically insulating material, the sleeve and the connection areas of the first with the third electrical conductor, and of the second with the fourth electrical conductor.

12. Junction assembly according to claim 1, wherein the intermediate wall is bounded, at two opposite ends thereof, by two edges having cross section tapering towards the outside, for example V or ogive shaped, so as to promote the introduction and the positioning of the first, second, third and fourth conductor in the sleeve.

13. Thermocouple sensor comprising:
a) a junction assembly having the features according to claim 1;
b) a detecting portion in turn comprising the first electrical cable of the junction assembly, where the first and the second electrical conductor are made of materials different from one another so as to produce a substantial thermoelectric effect; and
c) an extension portion in turn comprising the second electrical cable of the junction assembly.

14. Thermocouple sensor according to claim 13, wherein the first and the second electrical conductor are made of materials different from one another so as to produce one or more of the following effects: Seebeck effect, Peltier effect, Thomson effect.

15. Junction assembly according to claim 1, wherein each of the two ends of the sleeve is fastened to the first or second electrical cable by crimping the end of the sleeve on its respective electrical cable.

* * * * *